(No Model.)

C. E. FANNING.
SPROCKET CHAIN.

No. 536,863. Patented Apr. 2, 1895.

WITNESSES:

INVENTOR
C. E. Fanning
BY
Munn & Co.
ATTORNEYS.

UNITED STATES PATENT OFFICE.

CHARLES E. FANNING, OF KEOKUK, IOWA.

SPROCKET-CHAIN.

SPECIFICATION forming part of Letters Patent No. 536,863, dated April 2, 1895.

Application filed July 20, 1894. Serial No. 518,103. (No model.)

*To all whom it may concern:*

Be it known that I, CHARLES E. FANNING, of Keokuk, in the county of Lee and State of Iowa, have invented a new and Improved Sprocket-Chain, of which the following is a full, clear, and exact description.

Reference is to be had to the accompanying drawings, forming a part of this specification, in which similar letters of reference indicate corresponding parts in all the figures.

Figure 1:
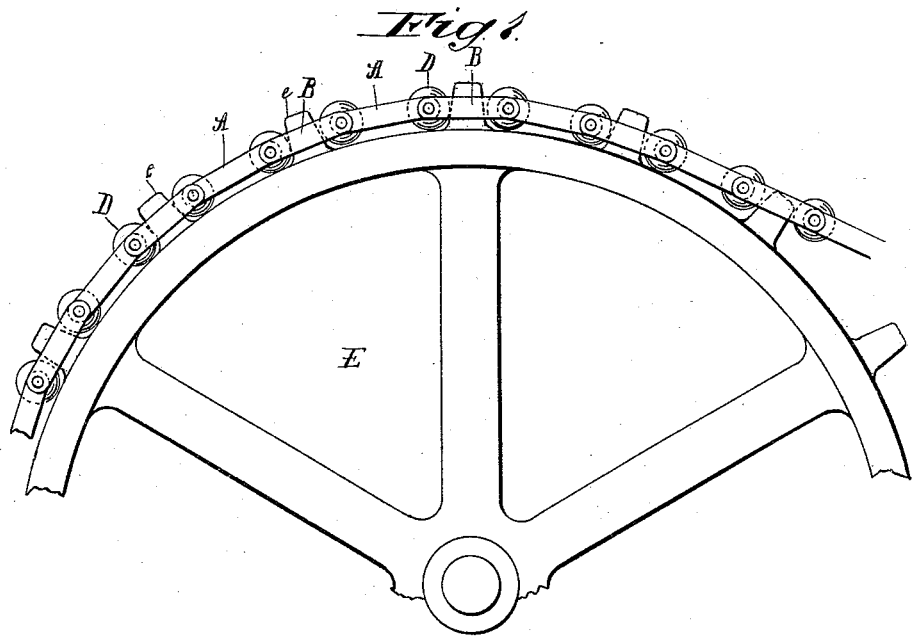
Figure 2:
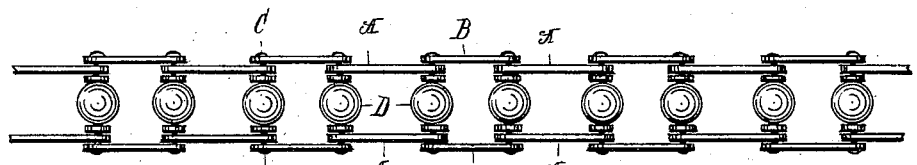
Figures 3, 4, 5:
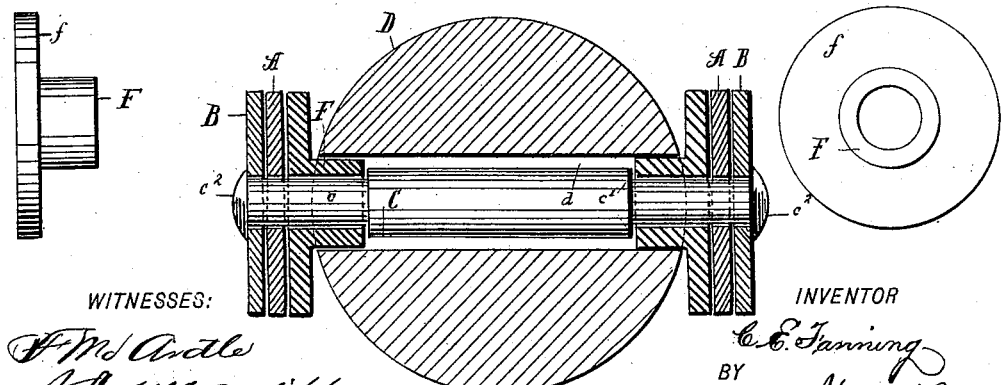

Figure 1 is a broken side elevation of a section of a sprocket chain embodying my invention and showing a portion of a sprocket wheel. Fig. 2 is a broken plan view of a section of the chain. Fig. 3 is a cross section of the chain, on a larger scale. Fig. 4 is an edge view of a flanged sleeve employed in the construction of the chain; and Fig. 5 is a face view of such sleeve.

The object of my invention is to provide a sprocket chain for bicycles and the like, in which the parts are so constructed and arranged as to reduce friction and wear, thus decreasing the tendency of the parts to loosen, and thereby preventing lengthening of the chain and the consequent tendency to whip sidewise when being driven.

The invention also has for its object to brace the links against sidewise strain at their points of connection and prevent all lateral play thereof, and further to provide a chain having balls so formed and arranged as to insure a movement of the same on their axes by the sprocket teeth, thus freeing the chain of mud and dirt.

In constructing a sprocket chain in accordance with my invention, the same is made up of pairs of links A and alternating pairs of shorter links B, the links being pivotally connected together at their ends by pintles C, on which are mounted in a novel manner the balls D, which are located between the links and engage the teeth $e$ of a sprocket wheel E. Each pintle C has preferably reduced ends $c$ forming shoulders $c'$ at the junction of the reduced and larger diameter, and on such reduced ends are placed the sleeves F which are formed with flanges $f$, and on said sleeves the balls D are mounted.

The reduced ends $c$ pass also through the overlapping ends of two adjacent links A, B, and the ends of the pintle C are upset outside of the links, as at $c^2$, thereby holding the parts in position with the inner ends of the sleeves F abutting the shoulders $c'$.

It will be observed from Fig. 3 that the sleeves F are of larger diameter than the pintle C, and the bore $d$ of the ball D is of a diameter to receive such sleeves, the latter extending into the bore but a short distance from each end. Thus the wall of the bore of the ball contacts only with the sleeves F and is spaced from the pintle C, and the only frictional contact with the pintle is that between its reduced ends and the sleeve and links; also, the ball D on its exterior rounds to an angle with the wall of its bore, thus presenting only very small surface to the flanges $f$, with which it contacts. This construction, by reducing friction between the parts reduces wear and thus prevents looseness that would result in a lengthening of the chain with a consequent tendency to whip; also the flanged sleeves maintain the links in close relation and maintain the balls in proper position for engaging the sprocket teeth, and materially strengthen the chain.

By providing alternate short and long links, the balls are assembled in pairs and the balls of each pair are sufficiently close to cause each to contact with the sprocket tooth, and be moved on its axes by the tooth, thus freeing the chain of dirt and mud, and by reducing the friction between the balls and the parts on which they are mounted, the balls readily move on their axes when engaging the teeth, and grinding action and consequently friction between the balls and the teeth are thus prevented.

Having thus fully described my invention, I claim as new and desire to secure by Letters Patent—

1. As a new article of manufacture, a sprocket chain comprising links, pintles uniting the links, balls surrounding the pintles between the links, and flanged sleeves fitting reduced ends of the pintles and entering the balls and spacing the same from the pintles, the flanges of the sleeves abutting the inner surfaces of the links adjacent thereto, substantially as and for the purpose described.

2. As a new article of manufacture, a sprocket chain comprising links, pintles uniting the links, balls having bores through which the pintles pass, and flanged sleeves fitting the pintles at their ends, the sleeves entering the bores of the balls and the flanges of the sleeves abutting the inner surfaces of the links adjacent thereto, substantially as and for the purpose described.

CHARLES E. FANNING.

Witnesses:
W. L. McNAMARA,
EUGENE REEVES.